(12) United States Patent
Unnerstall et al.

(10) Patent No.: US 10,769,575 B2
(45) Date of Patent: Sep. 8, 2020

(54) DISTRIBUTION SYSTEMS AND RELATED METHODS

(71) Applicant: MASTERCARD INTERNATIONAL INCORPORATED, Purchase, NY (US)

(72) Inventors: Rick Unnerstall, O'Fallon, MO (US); Bernard Wong, Markham (CA); Corey M. Hively, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 400 days.

(21) Appl. No.: 15/715,478

(22) Filed: Sep. 26, 2017

(65) Prior Publication Data
US 2019/0095858 A1    Mar. 28, 2019

(51) Int. Cl.
*G06Q 40/00* (2012.01)
*G06Q 10/08* (2012.01)
*G06Q 20/10* (2012.01)
*H04W 4/06* (2009.01)
*H04W 4/02* (2018.01)
(Continued)

(52) U.S. Cl.
CPC ......... *G06Q 10/0833* (2013.01); *G06Q 20/10* (2013.01); *G06Q 40/00* (2013.01); *H04L 67/18* (2013.01); *H04W 4/02* (2013.01); *H04W 4/06* (2013.01); *H04L 67/306* (2013.01); *H04W 88/02* (2013.01)

(58) Field of Classification Search
CPC .................................................. G06Q 40/00
See application file for complete search history.

(56) References Cited

U.S. PATENT DOCUMENTS

| 6,934,692 B1* | 8/2005 | Duncan | G06Q 40/00 |
| | | | 705/39 |
| 2004/0064405 A1* | 4/2004 | Weichert | G06Q 30/06 |
| | | | 705/39 |

(Continued)

OTHER PUBLICATIONS

Elham Ramezani, Mobile Payment, Jun. 2008, E- Business Technology, web, 1-18 (Year: 2008).*

*Primary Examiner* — I Jung Liu
(74) *Attorney, Agent, or Firm* — Harness, Dickey & Pierce, P.L.C.

(57) ABSTRACT

Systems and methods are provided for distributing parcels to recipients based on location data associated with the recipients. One exemplary method includes generating and storing a shipping file for the recipient, where the shipping file includes an identifier for a portable communication device associated with the recipient and a defined geographic region for the recipient, and retrieving location data for a location of the portable communication device based on the identifier associated with the portable communication device. The method also includes determining whether the location of the portable communication device is within the defined geographic region. The method then further includes directing an entity associated with the parcel to ship the parcel to the recipient when the location is determined to be within the defined geographic region, and directing the entity to hold shipment of the parcel when the location is determined to be outside the defined geographic region.

20 Claims, 4 Drawing Sheets

(51) Int. Cl.
*H04L 29/08* (2006.01)
*H04W 88/02* (2009.01)

(56) References Cited

U.S. PATENT DOCUMENTS

2004/0199470 A1* 10/2004 Ferry, Jr. ............... G06Q 20/20
                                                    705/44
2008/0210753 A1*  9/2008 Plozay ................... G06Q 40/02
                                                    705/14.27
2009/0048968 A1*  2/2009 Bishop ................... G06Q 40/00
                                                    705/39

* cited by examiner

DISTRIBUTION SYSTEMS AND RELATED METHODS

FIELD

The present disclosure generally relates to distribution systems and related methods, and in particular, to distribution systems for directing parcels to recipients based on location data for the recipients relative to one or more geographic regions, and methods related thereto.

BACKGROUND

This section provides background information related to the present disclosure which is not necessarily prior art.

Consumers are known to use payment accounts to fund transactions at merchants for the purchase of products. In addition, merchants commonly provide virtual merchant locations through which the consumers are able to browse such products, select desired ones of the products, and ultimately purchase the selected products. Consumers are further permitted, through the virtual locations, to arrange for shipping of the purchased products from the merchants to the consumers, and in particular, to delivery addresses specified by the consumers. Thereafter, the merchants, alone or in combination with one or more couriers, ship the products to the consumers at the specified addresses.

It is also known for consumers to subscribe to services for delivery of products, at regular or irregular intervals, for example, to replenish products used within their residences. For such recurring transactions, the merchants initiate payment account transactions for the products at the specified intervals, and then ship the products themselves, or in combination with one or more couriers, to delivery addresses designated by the consumers, as described above.

DRAWINGS

The drawings described herein are for illustrative purposes only of selected embodiments and not all possible implementations, and are not intended to limit the scope of the present disclosure.

Figure 1:
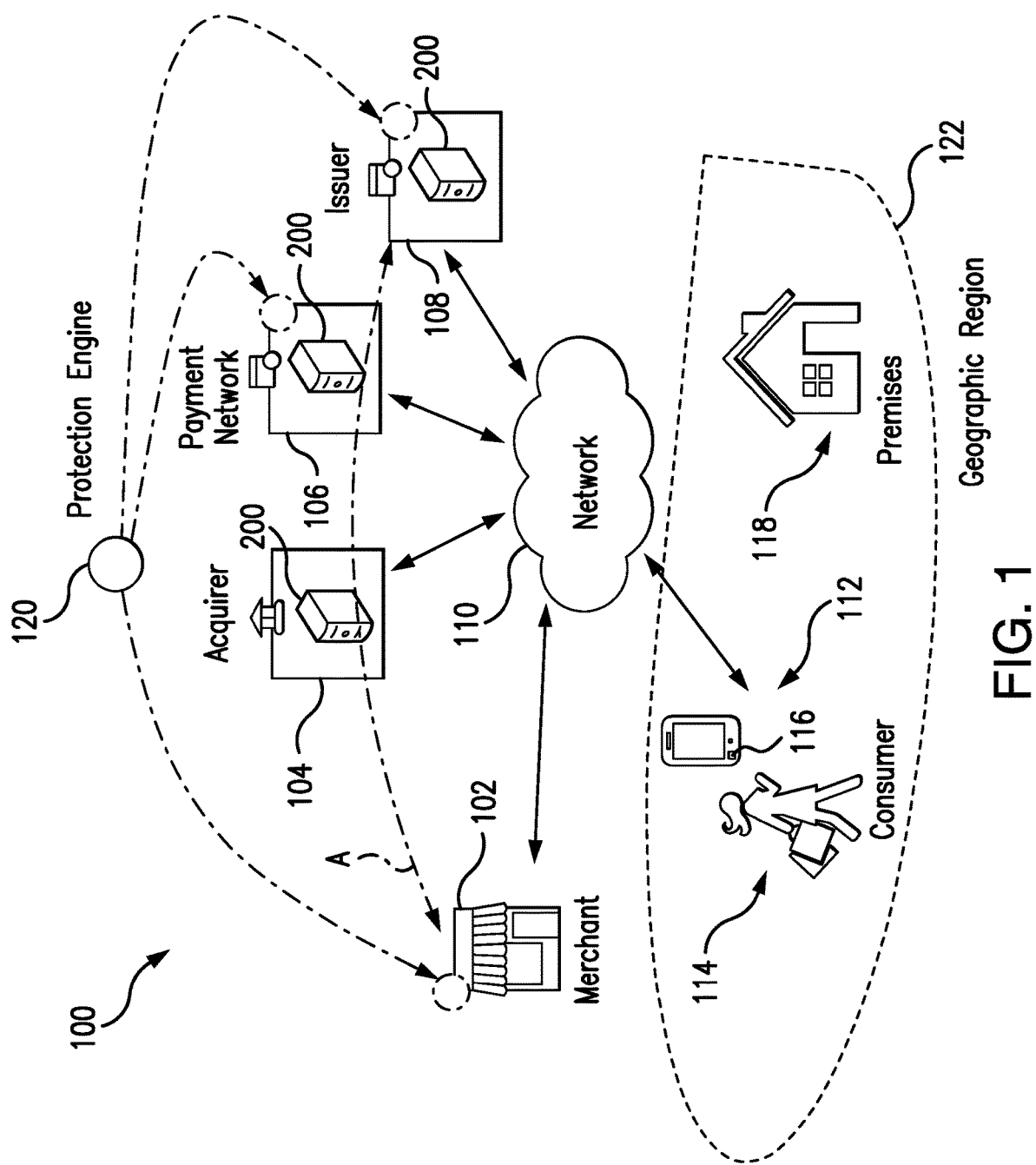
FIG. 1 illustrates an exemplary system of the present disclosure suitable for use in distributing parcels, including products, to consumers based on location data associated with the consumers.
Figures 3, 4, 5:
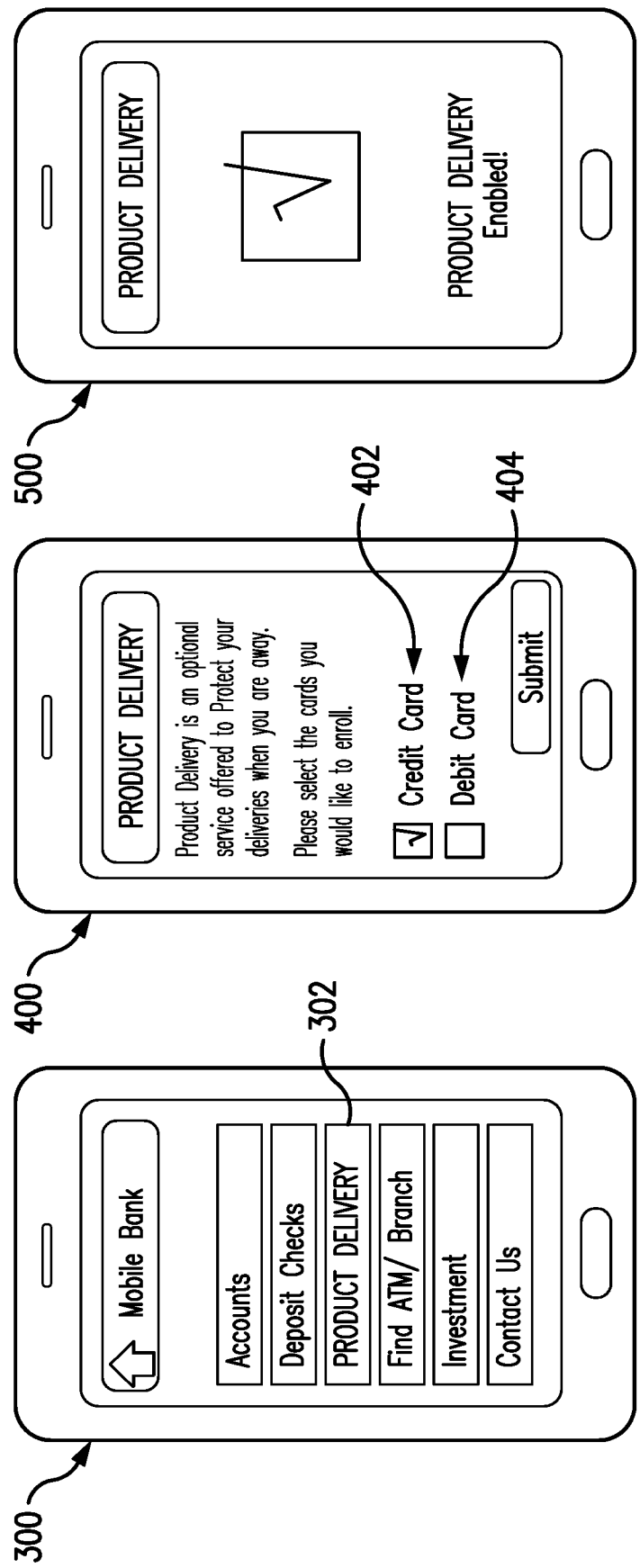
Figure 6:
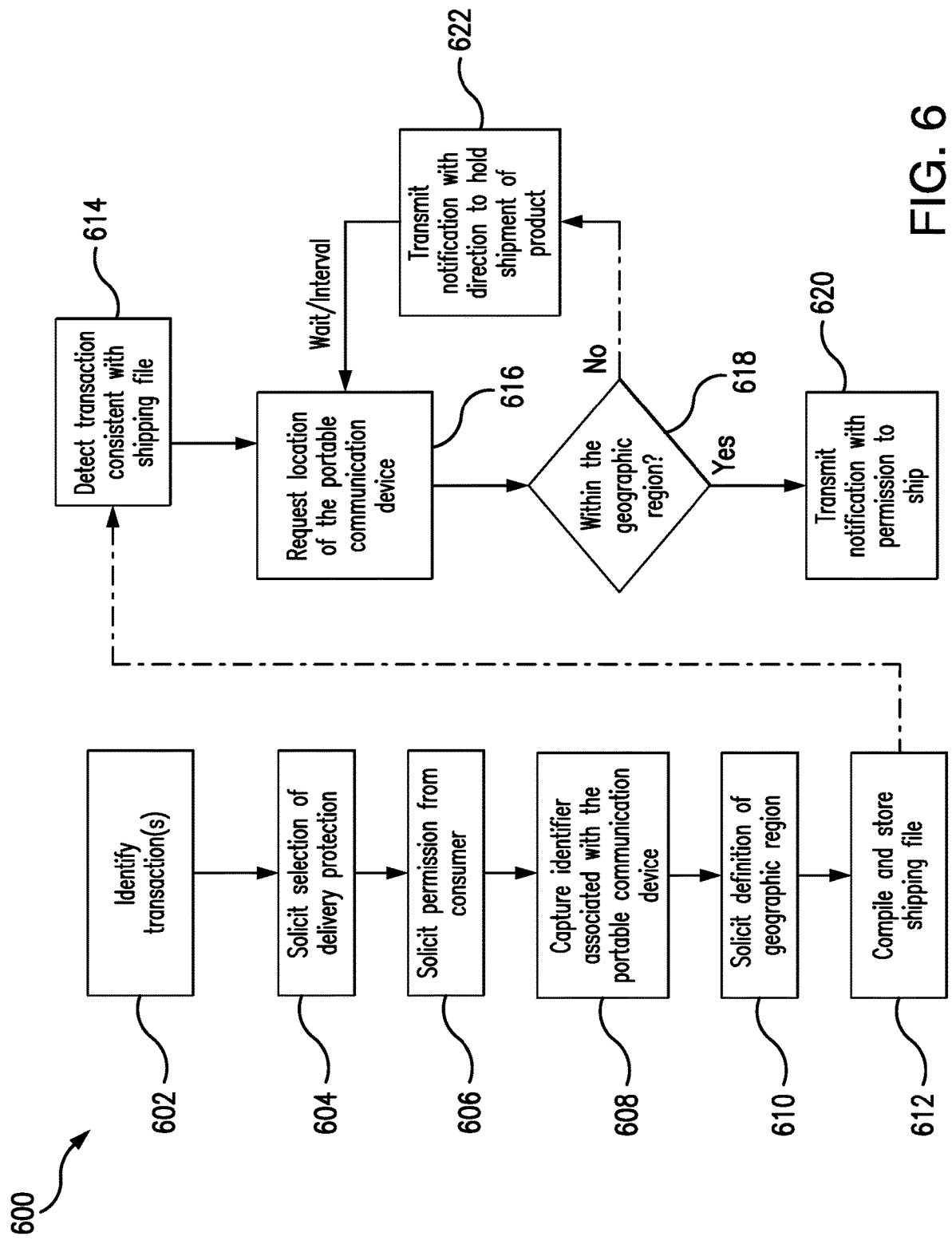

FIGS. 3-5 illustrate exemplary interfaces that may be used to solicit input from a user to enable a delivery protection service in connection with the system of FIG. 1; and FIG. 6 is a flow diagram of an exemplary method, which may be implemented in connection with the system of FIG. 1, for shipping a parcel to a consumer, in response to the consumer purchasing one or more products to be included in the parcel, based on location data associated with the consumer.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment accounts are used by consumers to purchase products (e.g., goods and services, etc.) from merchants, including, without limitation, from virtual locations associated with the merchants, etc. A number of purchases from virtual merchant locations involve product subscriptions, whereby a number of recurring purchases, and thus transactions, are scheduled (e.g., weekly, monthly, bi-monthly, etc.) in connection with the original purchases. At the scheduled times, then, transactions are initiated for the products, and the products are shipped via parcels, by the merchants, to the purchasing consumers (based on shipping information provided to the merchants by the consumers, etc.). In so doing, delivery information is often transmitted to the consumers in advance of the shipments (or at about the same time, or shortly thereafter), with estimated dates/times of arrival. The estimated delivery dates/times (as well as the actual delivery dates/times), however, may be when the consumers are away from the delivery addresses (e.g., the consumers' residences, etc.), thereby leaving the products in unsecured conditions at the addresses until the consumers return, or other persons associated with the consumers (or the products) are able to secure the products.

Uniquely, the systems and methods herein permit locations of the recipient consumers to be checked, prior to the parcels (including the products) being shipped to the consumers. In particular, the systems and methods allow a consumer to opt into delivery protection with a protection engine, in connection with scheduling a product transaction (e.g., a recurring transactions, etc.) with one or more merchants. Thereafter, when the scheduled purchase is performed, the protection engine communicates with a portable communication device associated with the consumer to determine if the consumer is within a geographic region associated with delivery of the product (e.g., within a geographic region of a delivery address for the product, etc.). If the consumer is within the geographic region, the protection engine provides a notification to the merchant to ship the product to the consumer (or potentially, takes no action). Conversely, if the consumer is outside the geographic region, the protection engine provides a notification to the merchant including a direction to hold shipment of the product, thereby permitting the merchant to hold the product until a later time when the consumer is within the geographic region, or as otherwise directed by the consumer. In this manner, the merchant may avoid shipping a product to the consumer when the consumer is not at the delivery address, resulting in the product being delivered and left in an unsecure condition (e.g., exposed to weather or theft, etc.) until the consumer returns and/or arranges for the product to be picked up. As such, the methods and systems herein provide more control to the consumer in connection with such product delivery, while improving customer service for the given merchant.

FIG. 1 illustrates an exemplary system 100 suitable for use in distributing parcels to recipients, and in which one or more aspects of the present disclosure may be implemented. Although the system 100 is presented in one arrangement, other embodiments may include the parts of the system 100 (or other parts) arranged otherwise depending on, for example, the manner of shipping parcels to consumers containing products purchased from merchants, involvement of other entities in the shipping of the parcels, manners of identifying geographic regions for consumers, etc.

The system 100 generally includes a merchant 102, an acquirer 104 generally associated with the merchant 102, a payment network 106, and an issuer 108 configured to issue payment accounts (or other accounts) to consumers, each of which is coupled to (and is in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which may provide interconnection between the merchant 102 and/or a communication device 112 associated with a consumer 114 (e.g., a recipient, etc.), etc.

In general herein, the merchant 102 offers products (e.g., goods, services, etc.) for sale to consumers, including the consumer 114. In connection therewith, the merchant 102 may have a physical location, at which the consumer 114 is permitted to browse and purchase the products, or the merchant may provide a virtual location (e.g., via one or more websites or other network-based applications, etc.) through which the consumer 114 can browse and purchase the products. The merchant 102, in this exemplary embodiment, further offers products for sale by subscription, where the products are purchased according to a schedule. That is, for example, the consumer 114 may opt to purchase, from the merchant 102, a water filter for a refrigerator every three months (or at some other interval, also referred to herein as a recurring transaction). As such, the merchant 102 initiates the purchase transaction at the specified interval, and then ships the water filter to the consumer 114.

In addition in the system 100, the consumer 114 is associated with a payment account issued by the issuer 108. What's more, in this exemplary embodiment, the issuer 108 provides a network-based application 116, which is installed, in whole or in part, at the consumer's portable communication device 112. The network-based application 116 may include a virtual wallet application, which is provisioned with a payment account credential for the consumer's payment account. The payment account credential may include a payment token, a primary account number (PAN) for the payment account, an expiration date for a payment device associated with the payment account, a, card verification code (CVC) for the payment device, etc. That said, the network-based application 116 may be limited to the operations described herein, and potentially to operations other than those related to payments, whereby in such instances the network-based application 116 may not be (or include) a virtual wallet application (but may include another network-based application provided by the issuer 108 (e.g., a protection application, etc.), etc.).

Further, the consumer 114 is associated with a premises 118, which is associated with an address (e.g., a shipping address herein, etc.). The premises 118 may include, for example, a home, an apartment, a condominium, an office building, or other structure, etc. In general, the premises 118 may include any location at which the consumer 114 may opt or decide to ship (and receive) one or more products purchased form the merchant 102. And, the premises 118 will be generally associated with the consumer 114, such that the address of the premises 118 may be relied upon as a basis for comparison to a location of the consumer 114 (i.e., as a basis for comparison to a location of the portable communication device 112), as described herein.

With that said, in an example interaction between the consumer 114 and the merchant 102, the consumer 114 may browse through the products offered for sale by the merchant 102 and select one or more product(s) to purchase, according to a subscription, for example. The consumer 114 then selects to checkout (either in person or via the merchant's virtual location) and provides the payment credential to the merchant 102 for his/her payment account (e.g., via the network-based application 116 when operating as a virtual wallet application, etc.), to pay for the first transaction for the product (in connection with the subscription). In turn, the merchant 102 is configured to compile and submit an authorization request for the transaction (including the payment account credential received from the consumer 114) to the acquirer 104, along path A as referenced in FIG. 1. The acquirer 104 communicates the authorization request with the payment network 106 (e.g., such as MasterCard®, VISA®, Discover®, American Express®, etc.), to provide one or more services for the transaction including, for example, conversion of a token (if present as the payment credential) to a different payment account credential (e.g., the PAN, etc.), and the payment network 106 passes the authorization request to the issuer 108. The issuer 108, then, determines whether the consumer's payment account is in good standing and whether there is/are sufficient funds and/or credit to cover the transaction, and potentially applies one or more fraud prevention rules, authentication rules, and/or validation rules thereto, etc. If the transaction is approved, an authorization reply or response (indicating the approval of the transaction) is transmitted back from the issuer 108 to the merchant 102, again along path A, thereby permitting the merchant 102 to complete the transaction. The transaction is later cleared and/or settled by and between the merchant 102, the acquirer 104, and the issuer 108 by appropriate agreements. If the transaction is declined, however, the authorization reply (indicating the decline of the transaction) is provided back to the merchant 102, also along path A, thereby permitting the merchant 102 to request alternate funding, or to terminate the transaction.

In connection with the above interaction, the merchant 102 is also configured to append the subscription for the purchased product to a recurring transaction instruction, which the merchant 102 is then configured to execute at the interval defined by the consumer 114 for the subscription (e.g., every three months for the water filter in the above example, etc.). In connection therewith, and with permission from the consumer 114, the merchant 102 is configured to store the payment account credential for the consumer's payment account. And, the above is then repeated with regard to the authorization request for the subsequent transaction for the product (and for each additional subsequent transaction associated with the subscription), although actually initiated by the merchant 102 based on the stored payment account credential for the consumer's payment account.

While a simplified example is provided herein for purposes of illustration, it should be appreciated that additional interactions between the consumer 114 and the merchant 102 may occur and relate to authentication of the consumer 114 in connection with the initial transaction of the subscription, or even with the recurring transactions thereafter.

Transaction data is generated, collected, and stored as part of the above interactions among, the merchant 102, the acquirer 104, the payment network 106, the issuer 108, and the consumer 114. The transaction data represents at least a plurality of transactions, for example, authorized transactions, cleared and/or settled transactions, etc. The transaction data, in this exemplary embodiment, is stored at least by the payment network 106 (e.g., in a data structure associated with the payment network 106, etc.). In general, transaction data may include, for example, PANs for payment accounts involved in the transactions, payment tokens, amounts of the transactions, shipping details and/or parameters, merchant IDs for merchants involved in the transactions, merchant category codes (MCCs), dates/times of the transactions, etc. It should be appreciated that more or less information related to transactions, as part of either authorization or clearing and/or settling, may be included in transaction records and stored within the system 100, at the acquirer 104, the payment network 106 and/or the issuer 108.

While one merchant 102, one acquirer 104, one payment network 106, and one issuer 108 are illustrated in FIG. 1, it should be appreciated that any number of these entities (and their associated components) may be included in the system 100, or may be included as a part of systems in other embodiments, consistent with the present disclosure. Likewise, it should be appreciated that the system 100 is not limited to only one portable communication device 112 and only one consumer 114, as numerous portable communication devices and consumers will likely be included in various implementations of the systems and methods described herein. As such, the system 100 may accommodate multiple transactions similar to the one described above.

In various exemplary embodiments, consumers (e.g., consumer 114, etc.) involved in the different transactions herein are prompted to agree to legal terms associated with their payment accounts, for example, during enrollment in their accounts, or during installation and/or activation of network-based applications at their communication devices, or during selection of certain options herein (e.g., selection of delivery protection herein, etc.), etc. In so doing, the consumers may voluntarily agree, for example, to allow payment networks and/or issuers, etc. to use data collected during enrollment and/or collected in connection with transactions, subsequently for one or more different purposes, for example, to intermittently track locations associated with the consumers (including the consumer 114, etc.), via applications (e.g., the network-based application 116, etc.) installed and/or active at their communication devices (e.g., the portable communication device 112, etc.) in connection with delivery protection services (described below). Any location data related to the consumers is strictly restricted for use as permitted by the consumers and/or in connection with the specific delivery protection services.

Figure 2:
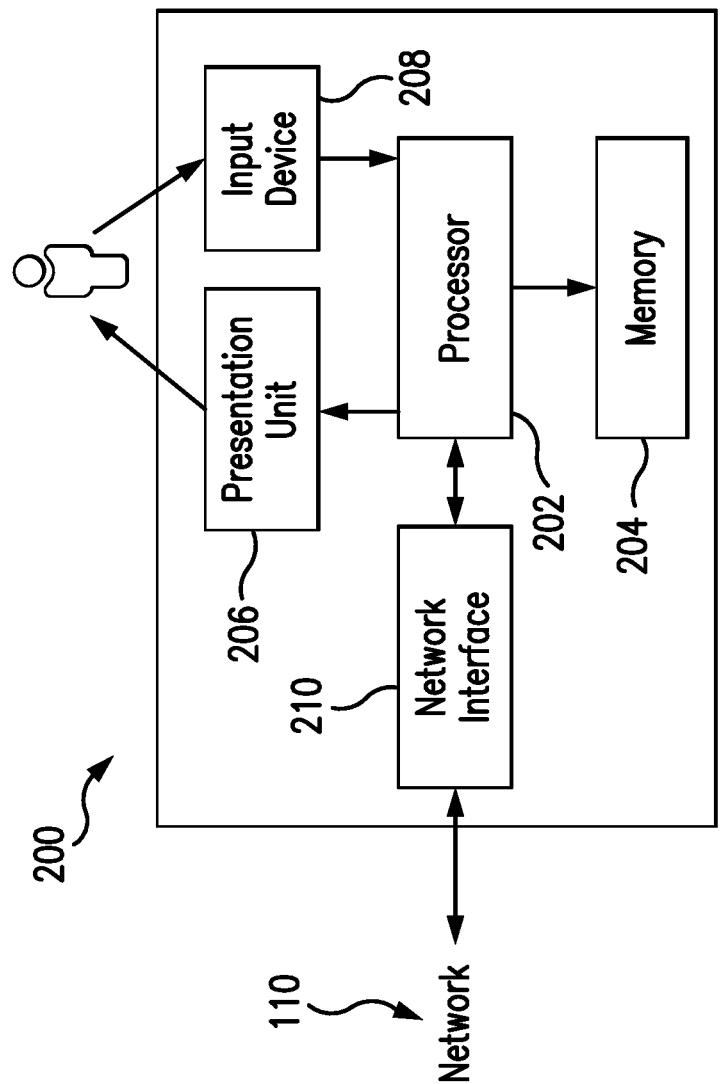
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the acquirer 104, the payment network 106, and the issuer 108 are illustrated as including, or being implemented in, computing device 200, coupled to (and in communication with) the network 110. In addition, the merchant 102 may also be considered as including and/or being implemented in at least one computing device consistent with computing device 200. Further, the communication device 112 associated with consumer 114 can be considered a computing device consistent with computing device 200 for purposes of the description herein. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, tokens, shipping data/instructions, location data, purchase instructions, shipping files, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and is in communication with) the processor 202 (however, it should be appreciated that the computing device 200 could include output devices other than the presentation unit 206, etc.). The presentation unit 206 outputs information (e.g., options for delivery protection, etc.), visually, for example, to a user of the computing device 200, such as the consumer 114 in the system 100, etc. And, various interfaces (e.g., as defined by network-based applications, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) such as, for example, inputs by the consumer 114 to the communication device 112 to purchase a product, to designate the network-based application 116 for use in a payment account transaction, etc. The input device 208 may include a single input device or multiple input devices. The input device 208 is coupled to (and is in communication with) the processor 202 and may include, for example, one or more of a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC™) adapter, a Bluetooth™ adapter, etc.), a mobile network adapter, or other device capable of communicating to one or more different networks, including the network 110. Further, in some exemplary embodiments, the computing device 200 may include the processor 202 and one or more network interfaces incorporated into or with the processor 202. In various embodiments, the computing device 200 also includes global positioning system (GPS) capability whereby the computing device 200 may determine its current geographic location, etc. For example, the GPS capability of the portable communication device 112 may be used to determine and transmit a location of the consumer 114, for use as described below.

Referring again to FIG. 1, the system 100 includes a protection engine 120, which is specifically configured, by computer executable instructions, to perform one or more of the operations described herein. In the illustrated embodiment, the protection engine 120 is provided as a separate part of the system 100 and is in communication with the payment network 106, for example, via network 110. As such, the protection engine 120 may be considered (or may be implemented in) a computing device consistent with computing device 200. However, as indicated by the dotted lines in FIG. 1, the protection engine 120 may be incorporated, partly or entirely, into the merchant 102, the payment network 106, and/or the issuer 108 in other system embodiments. With that said, it should be appreciated that the protection engine 120 may be associated with, or incorporated with, still other parts of the system 100, in other embodiments, including, for example, the acquirer 104, the consumer's communication device 112, etc.

In the illustrated embodiment, the protection engine 120 is configured to interact with the payment network 106 (as generally indicated by the arrow there between) and the network-based application 116 (e.g., via the network 110, etc.). For instance, as part of the example product purchase described above between the merchant 102 and the consumer 114 (where the consumer 114 makes use of the network-based application 116 in purchasing the product), and the corresponding subscription purchased by the consumer 114 in association therewith, the merchant 102 is configured to prompt the consumer 114 for delivery instructions of the product, including, for example, a shipping address, etc. (e.g., in person, via the merchant's website, via an application programming interface (API) associated therewith, etc.), whereby the merchant 102 is configured then to ship the current product and/or the subsequent products to the shipping address (when the transaction(s) is/are approved by the issuer 108). In addition, the consumer 114 is prompted, via the network-based application 116 (and/or via an API call to the merchant 102 and/or protection engine 120), to identify the purchase to the protection engine 120 and, potentially, to identify it as a recurring transaction, and to provide the name of the merchant 102, the amount of the purchase, the interval of the recurring purchase, and/or more or less information about the transaction and/or future recurring transactions as desired.

Thereafter, in this example, the protection engine 120 is configured to solicit a selection of the delivery protection option from the consumer 114 (e.g., as a service facilitated through the payment network 106, etc.), through one or more interfaces that the protection engine 120 causes to be displayed to the consumer 114 at the portable communication device 112 (e.g., at the network-based application 116, via one or more APIs facilitated by the protection engine 120, etc.), for the instant purchase and/or for the recurring purchases. The protection engine 120 is further configured, in some embodiments, again through one or more interfaces, to solicit permission for the protection engine 120 to track a location of the consumer 114, specifically and strictly in connection with the delivery protection option. In connection therewith, the consumer 114 may provide direct permission for to allow the protection engine 120 to track his/her location (via the consumer's communication device 112). Alternatively, where the consumer 114 purchases a product as a gift for another person (where the other person is then the recipient of the product), and desires to make use of the protection engine 120 for delivery of the gift to the other person, the other person may contact the protection engine 120 (via one or more websites and APIs, etc.) and provide the permission or, where the gift is identified from a wish list or registry, etc., the other person may provide the permission in connection with identifying the product to the wish list or registry, etc. In any case, such permission is obtained for the protection engine 120 to track a location of the consumer 114 or other person.

In addition, the protection engine 120 may be configured to capture an identifier associated with and generally unique to the portable communication device 112 of the consumer 114 (or portable communication device associated with another person to which the product is to be delivered), based on inputs solicited from the consumer 114 (or other person), where the identifier includes, without limitation, a phone number, an email address, etc. Alternatively, or additionally, the protection engine 120 may be configured to capture an identifier for the communication device 112 based on its interaction with the communication device 112 (and specifically, the network-based application 116 when designating the example product purchase as a recurring transaction to the protection engine 120). In this way, the identifier may include a media access control (MAC) address of the portable communication device 112, a unique identifier (UID) therefore, a device identification for the device 112, an electronic serial number (ESN), an application identifier associated with the network-based application 116, etc.

Further, through the interface(s) displayed to the consumer 114 at the communication device 112, the protection engine 120 is configured to solicit a geographic region associated with the consumer 114. In particular, the protection engine 120 (as described below) may alter the shipping of the purchased product (or products) to the consumer 114 based on the consumer's location. As such, the geographic region, as provided and/or defined by the consumer 114 (via the interface(s)), generally provides a boundary at which the consumer 114 will be considered to be "at home" whereby the shipping of the purchased product(s) will be permitted to proceed. For example, the consumer 114, in response to the geographic region solicitation from the protection engine 120, may define his/her geographic region as the city, postal code (or multiple postal codes), area code, regularly traveled cities, counties, or other regions, within which the consumer 114 may travel in a given day, but still return home that day or within some other interval whereby the consumer 114 would still want the product(s) shipped to his/her home/desired address when the consumer 114 is within the given geographic region. For example, one consumer may stay within a particular postal code each day, except when on vacation, whereby the consumer might set the geographic region to that postal code. Another consumer may regularly travel to multiples cities in a day, but still return daily to his/her home, whereby that consumer might set the geographic region to include those additional cities. In FIG. 1, the geographic region for the consumer 114 (as generally provided by the consumer to the protection engine 120 via the interface(s)) is designated by dotted line 122 (e.g., a given city, etc.), and includes the consumer's premises 118. With that said, the geographic region, as used herein, is not limited to a home premises/address, but may include any address/location specified by the consumer 114 or recipient of the product/parcel being shipped.

It should be appreciated that the option for delivery protection and the geographic region, as described herein, may only be solicited by the protection engine 120 for a first use of the delivery protection option, and may then be made automatically thereafter (based on the prior designation(s)), unless the consumer 114 opts out of the delivery protection option or desires to change features thereof (e.g., the geographic region designation, etc.).

Next in the system 100, once the proper permission is provided by the consumer 114 (or other recipient) to the protection engine 120, and once the consumer 114 selects the option for the delivery protection feature and defines the desired geographic region, the protection engine 120 compiles and stores a shipping file for the product(s) to be purchased by the consumer 114 (i.e., for the instant product being purchased and/or for the products subject to the subscription provided to the consumer 114 by the merchant 102). The shipping file includes one or more parameters with which to detect the recurring transaction(s), the identifier associated with the portable communication device 112 (as obtained by the protection engine 120, for example), the defined geographic region for the consumer 114, and/or other instructions and/or information suitable to be used in connection with the delivery protection feature.

Then, at a time when the merchant 102 proceeds with a payment account transaction for the purchase of a recurring product (based on the corresponding subscription plan provided by the merchant 102 to the consumer 114), the protection engine 120 (via communication with the payment network 106, for example) detects a transaction consistent with the shipping file (e.g., based on inclusion of the payment account credential for the consumer's payment account included in a corresponding authorization request and identification of the merchant 102, etc.).

In response, the protection engine 120 is configured to request the location of the portable communication device 112 (and specifically, the network-based application 116). In turn, the portable communication device 112 is configured to determine its location (e.g., via the network interface 210 and associated GPS capability, etc.) (as a proxy for the location of the consumer 114) and to return the location to the protection engine 120. The protection engine 120 is configured to then determine if the location received from the portable communication device 112 is inside or outside of the geographic region 122 defined by the consumer 114 (as "home") (and as included in the shipping file). When within the geographic region 122 (as shown in FIG. 1), the protection engine 120 is configured to provide a notification (or instruction) to the merchant 102 (and/or a carrier associated with the merchant 102) (e.g., via an indicator appended to an authorization message for the transaction, etc.), which includes a permission to ship the purchased product(s). Conversely, if the location from the portable communication device 112 is outside of the geographic region 122, the protection engine 120 is configured to provide a notification (or instruction) to the merchant 102 (and/or a carrier associated with the merchant 102) (e.g., via an indicator appended to an authorization message for the transaction, etc.), which includes a direction to hold the shipment of the product(s). In addition in such a scenario, the protection engine 120 may be configured to interact with the consumer 114 (via the network-based application 116 and/or a corresponding API) to solicit additional shipping instructions for the product (e.g., a target delivery date associated with the consumer's return to the geographic region 122, an alternate shipping address, etc.). Once, or if, received, the protection engine 120 is configured to transmit the additional shipping instructions to the merchant 102 (and/or a carrier associated with the merchant 102). With that said, it should be appreciated that the carrier may be incorporated in the merchant 102 or may be separately associated therewith, and/or may include additional parties for providing transit, any of which may receive instructions for shipping from the protection engine 120 as described herein.

Alternatively in the system 100, or additionally, when the location from the portable communication device 112 is outside of the geographic region 122, at one or more intervals, the protection engine 120 may be configured to ping the portable communication device 112 (and specifically, the network-based application 116) for a current location (e.g., at desired intervals, etc.). When the portable communication device 112 is back within the geographic region, the protection engine 120 is configured to provide a notification to the merchant 102 (e.g., via a message through the payment network 106, etc.), which includes a permission to ship the product(s). Upon receipt of the permission, the merchant 102 is configured to then ship the product(s) to the consumer 114 directly, or through one or more courier delivery services, and included in one or more parcels.

In another application of the system 100, the consumer 114 may register for and/or select to enable the delivery protection option (e.g., as a service facilitated through the payment network 106, etc.) for multiple desired transactions (and independent of and/or prior to any particular transaction). For instance, the protection engine 120 may be configured to solicit a selection of the delivery protection option from the consumer 114, through the network-based application 116 installed at the consumer's portable communication device 112 (and to solicit any necessary permission for the protection engine 120 to track a location of the consumer 114 as described above). In connection therewith, the consumer 114 may specify particular transactions for which the delivery protection option is to be applied, for example, transactions to specific payment accounts (e.g., to one specific payment account, to multiple specific payment accounts, to all payment accounts available to the consumer 114 in the network-based application 116, etc.), to specific merchants, involving specific MCCs, of specific transaction types (e.g., debit transactions, credit transactions, etc.), etc. And, as described above, the protection engine 120 may be configured to also capture an identifier associated with and generally unique to the portable communication device 112 of the consumer 114 and to solicit a geographic region associated with the consumer 114. The protection engine 120 is configured to then compile and stores a shipping file for the consumer 114 (as generally described above) for delivering products purchased by the consumer 114 and subject to the delivery protection option/service.

Then, in this application of the system 100, when the consumer 114 purchases a product at the merchant 102 (where the purchase is subject to the delivery protection option/service, the protection engine 120 (via communication with the payment network 106, for example) is configured to detect the transaction as being consistent with the shipping file for the consumer 114 (e.g., based on inclusion of the payment account credential for the consumer's payment account included in a corresponding authorization request and identification of the merchant 102, etc.). In response, the protection engine 120 is configured to request the location of the portable communication device 112 (and specifically, the network-based application 116) and determine if the location is inside or outside of the geographic region 122 defined by the consumer 114 (as "home") (and as included in the shipping file). When within the geographic region 122 (as shown in FIG. 1), the protection engine 120 is configured to provide a notification to the merchant 102 (through the payment network 106), which includes a permission to ship the purchased product(s). Conversely, if the location from the portable communication device 112 is outside of the geographic region 122, the protection engine 120 is configured to provide a notification to the merchant, which includes a direction to hold the shipment of the product(s).

With that said, FIGS. 3-5 illustrate exemplary interfaces 300-500 that may be displayed to the consumer 114 at the portable communication device 112, via the network-based application 116 (e.g., by the protection engine 120, etc.), in connection with enabling the delivery protection option described herein (e.g., where the network-based application 116 includes a mobile banking application, etc.). As shown in FIG. 3, the interface 300 illustrates multiple services available to the consumer 114 through the network-based application 116. Among others, the interface 300 includes the delivery protection option/service 302. FIG. 4 illustrates the interfaced 400, which may be displayed to the consumer 114 at the communication device 112 upon selection of the delivery protection option/service 302 at the interface 300. As shown, the interface 400 provides the consumer 114 with an option to identify particular transactions to which the delivery protection option/service will apply. In particular, the interface includes an option 402 for identifying credit card transactions and an option 404 debit card transactions. Upon selection of the option 402 for credit card transactions, the interface 500 of FIG. 5 may then be displayed to the consumer 114, confirming that the delivery protection option/service is enabled.

In still another application of the system 100, the merchant 102 may provide the delivery protection option/service herein as an available service to the consumer 114 in connection with a purchase of a product by the consumer 114 at the merchant 102. In so doing, in connection with the purchase by the consumer 114, the merchant 102 may register (or facilitate registration of) the consumer 114 with the protection engine 120 via an API call to the protection engine 120. The consumer 114 may then register for and/or enable the delivery protection service for the instant purchase at the merchant 102 and, potentially, for all future purchases at the merchant 102 (consistent with the description above).

With that said, in general in the system 100, the network based application 116 included at the communication device 112 associated with the consumer 114 (and/or any other applications herein) may receive or otherwise make use of a software development kit (SDK) from the protection engine 120, to allow the application 116 to be designed and/or configured to call the API(s) exposed and or made available by the protection engine 120 for example. In connection therewith, for example, the interfaces 300-500 illustrated in FIGS. 3-5 may utilize such SDK in order to provide the API calls to the protection engine 120 to allow for the product delivery service referenced therein.

FIG. 6 illustrates an exemplary method 600 for use in shipping a parcel based on location data associated with a consumer purchase of one or more products included in the parcel. The exemplary method 600 is described as implemented generally in the network-based application 116 and the protection engine 120 of the system 100, in connection with operations by the consumer 114, the merchant 102, and the portable communication device 112. The method 600 is also described with reference to the computing device 200. That said, however, the methods herein should not be understood to be limited to the system 100 or the computing device 200, as the methods may be implemented in other systems and/or computing devices. Likewise, the systems and the computing devices herein should not be understood to be limited to the exemplary method 600.

Further, the method 600 is described with reference to a recurring transaction for the purchase of a product between the consumer 114 and the merchant 102, set up by the consumer 114 as part of an initial purchase of the product at the merchant 102 and a corresponding subscription for the product provided by the merchant 102 to the consumer 114 (although it should be appreciated that the present disclosure is not limited to such recurring transactions). In connection therewith, or subsequently, the consumer 114 identifies, at 602, the desired transaction(s) (e.g., the recurring transactions in this example, etc.) to the protection engine 120 (i.e., identifying the transactions as potentially eligible for delivery protection), via the network-based application 116 (broadly, the protection engine 120 solicits an indication of transactions from the consumer 114 to which the delivery protection option/service is to apply). In addition in this example, the consumer 114 provides details related to the recurring transactions (via the application 116), such as, for example, a name or ID of the merchant 102, a transaction amount for each of the recurring transactions, an expect interval between recurring transactions, etc.

The protection engine 120 also solicits, at 604, selection and/or confirmation of the delivery production option from the consumer 114 for the identified transaction(s) (e.g., for the recurring transactions in this example, etc.). Again, the selection of the delivery protection option may be for the subject transaction(s), or it may be set as a default for the consumer 114 and thus applied/utilized for other transactions by the consumer 114, for example, with the merchant 102 or other merchants (e.g., by selection of a "Make Delivery Protection My Default," etc.), for transactions to particular payment account(s), etc., for transactions initiated using the network-based application 116, for other particular types of transactions by the consumer 114, etc.

Thereafter (or in connection therewith, or prior), the protection engine 120 solicits, at 606, permission from the consumer 114 to request location data from the portable communication device 112 via one or more interfaces provided to the consumer 114 via the portable communication device 112 (e.g., at presentation unit 206, etc.). The consumer 114 is then able to select the permission (e.g., by marking a checkbox using input device 208, etc.). The permission, when selected by the consumer 114, is delivered back to the protection engine 120.

As part of the interaction between the protection engine 120 and the communication device 112 related to soliciting and obtaining the permission, the protection engine 120 further captures, at 608, an identifier associated with the portable communication device 112 (for subsequent use by the protection engine 120 to identify the communication device 112 as need herein, etc.). As described above in the system 100, the identifier may include, for example, the application ID associated with the network-based application 116, the MAC identifier for the communication device 112, the ESN for the communication device 112, or the UID of the portable communication device 112, etc. In at least one embodiment, in order to capture the identifier, the protection engine 120 may solicit, directly or indirectly from the consumer 114, via one or more interfaces at the portable communication device 112, the identifier, which in this embodiment may then include, for example, a phone number and/or email address associated with the portable communication device 112, etc. In various embodiments, the identifier may further be tokenized by the consumer's portable communication device 112 (as provided to the protection engine 120 by the portable communication device 112, etc.), whereby the identifier then represents a tokenization reduction of the location of the portable communication device 112 (e.g., as a z-token, etc.).

With continued reference to FIG. 6, upon receipt of the permission and capture of the identifier, the protection engine 120 solicits, at 610, a definition of the geographic region 122 from the consumer 114, again via one or more interfaces provided to the portable communication device 112 (through the network-based application 116). The one or more interfaces may include, for example, a field for the consumer 114 to enter an address and to specify a range from that address defining the geographic region 122 (e.g., about ten miles, about twenty miles, about fifty miles, etc.). Additionally, or alternatively, the one or more interfaces may include a field for the consumer 114 to enter a postal code, or city (or cities), or county, or other predefined region, etc.

Once the consumer 114 defines the geographic region 122, as provided in the one or more interfaces, the protection engine 120 receives the definition of the geographic region 122, and compiles and stores, at 612, a shipping file for the consumer 114 and/or the product(s) included in the transaction (and potentially for future transactions by the consumer 114). The shipping file for the purchase includes, at the least, the identifier associated with the portable communication device 112 (to enable communication therewith) and a transaction identifier or indicator for the given transaction that is to be subjected to the delivery protection service, etc. Further information may be included in the shipping file, as desired or needed. The protection engine 120 may store the shipping file in memory, such as, for example, the memory 204.

At some time later, the protection engine 120 detects, at 614, the transaction by the consumer 114 at the merchant 102. For example, the protection engine 120 may identify particular payment accounts by their account numbers (and/or ranges of account numbers for the payment accounts, including the payment account issued to the consumer 114) to the payment network 106 for which the delivery protection service is enabled. In connection therewith, the payment network 106 may flag transactions to the identified payment accounts, including the consumer's payment account, and notify the protection engine 120 of such transactions. In turn, the protection engine 120 may then determine if the particular transactions are eligible for the delivery protection service (e.g., based on the details of the particular transactions as gleaned through the authorization requests, based on particular data provided by the consumers when enabling the delivery protection service, etc.).

In response, the protection engine 120 accesses the shipping file for the consumer 114 and, based on the identifier associated with the portable communication device 112 included therein, requests (or retrieves), at 616, the location of the portable communication device 112. In response, via the GPS network interface 210, for example, the portable communication device 112 determines its location and responds to the protection engine 120. As an example, the portable communication device 112 may respond to the protection engine 120, via an API call associated therewith, or through some other suitable manner of communication. Upon receipt, the protection engine 120 determines, at 618, whether the location of the portable communication device 112 is within the geographic region 122 included in the shipping file.

If the location is within the geographic region 122, the protection engine 120 transmits, at 620, a notification to the merchant 102 (e.g., via the API, etc.) with permission (or instruction) to ship the product to the consumer 114 (e.g., as a distribute indicator appended to a data element of the authorization reply message transmitted to the merchant 102, as a distribute indicator appended to a data element of the authorization request message transmitted to the issuer 108, etc.). Subsequently, the merchant 102 causes the product, as contained in one or more parcels, to be shipped to the consumer 114 (e.g., via one or more courier delivery services (e.g., United Parcel Service (UPS), Federal Express (FedEx), etc.), etc.). In addition, the merchant 102 may employ other manners of shipping parcels (containing product(s)) to the consumer 114, including drones, which would be permitted to proceed to physically ship the parcel(s) to the consumer 114 (or halted or grounded, pursuant to a hold direction below).

Conversely, when the location of the portable communication device 112 is outside the geographic region 122, the protection engine 120 transmits, at 622, a notification to the merchant 102 (e.g., via the API, etc.) with direction (or instruction) to hold shipment of product to the consumer 114 (e.g., as a hold indicator appended to a data element of the authorization reply message transmitted to the merchant 102, as a hold indicator appended to a data element of the authorization request message transmitted to the issuer 108, etc.). In connection therewith, the protection engine 120 may further, optionally, transmit a notification to the consumer 114, at the portable communication device 112, via the network-based application 116, or otherwise, to report the direction to hold the shipment. In response, the consumer 114 may respond with one or more instructions, to the protection engine 120, to proceed with shipping of the product(s) or to request a delay and/or other shipping details. In turn, the protection engine 120 may provide the instruction to the merchant 102, which responds accordingly.

Apart from consumer intervention in response to the hold notification (and providing specific shipping instructions), the protection engine 120 may also (or alternatively) wait for one or more regular or irregular intervals before, again, requesting the location of the portable communication device 112, at 616. In response, as above, the protection engine 120 determines, at 618, if the location (returned by the portable communication device 112) is within the geographic region 122 defined by the consumer 114. If the location is still outside the geographic region 122, the protection engine 120 optionally, as indicated by the dotted lines, again transmits, at 622, a notification to the merchant 102 (e.g., via the API, etc.) with direction to hold shipment of product to the consumer 114. The relevant step(s) will be repeated until the location of the portable communication device 112 is within the geographic region 122. Alternatively, the protection engine 120 may take no further action until the location request (in response to subsequent request) is within the geographic region 122, and then, at 620, transmit a notification to the merchant 102 (e.g., via the API, etc.) with permission to ship the product to the consumer 114.

In view of the above, the systems and methods herein provide a unique improvement to the fields of payment network transactions and product distribution and delivery. In particular, for example, when a package/product is purchased and is to be transported to a recipient by a merchant and/or associated carrier, in connection with the transaction, an engine initially confirms a location of the recipient (relative to a delivery address for the package), unconventionally, before allowing the package to be actually transported (or even attempted to be transported). Then, when the engine determines that the recipient is at an acceptable location (e.g., at or within an acceptable distance of the delivery address for the package, etc.), the engine instructs delivery of the package (e.g., instructs the merchant, the carrier, etc.). In this manner, and as part of the underlying payment account transaction, the package may be securely and safely delivered to the recipient, and transport of the package to the delivery address when the recipient is not at or near the address may be avoided.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) generating and storing a shipping file for the recipient, the shipping file including an identifier for a portable communication device associated with the recipient and a defined geographic region for the recipient; (b) in connection with an expected shipment of the parcel to the recipient, retrieving location data for a location of the portable communication device, from the portable communication device, based on the identifier associated with the portable communication device; (c) determining whether the location of the portable communication device is within the defined geographic region; (d) directing an entity associated with the parcel to ship the parcel to the recipient when the location is determined to be within the defined geographic region; and (e) directing the entity to hold shipment of the parcel when the location is determined to be outside the defined geographic region, whereby the entity holds shipment of the parcel until a time when the recipient is located within the defined geographic region.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure.

Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for distributing a parcel to a recipient based on location data associated with the recipient, the method comprising:
   generating and storing, by at least one computing device, a shipping file for the recipient, the shipping file including an identifier for a portable communication device associated with the recipient and a defined geographic region for the recipient;
   in connection with an expected shipment of the parcel to the recipient, retrieving, by the at least one computing device, location data for a location of the portable communication device, from the portable communication device, based on the identifier associated with the portable communication device;
   determining, by the at least one computing device, whether the location of the portable communication device is within the defined geographic region;
   directing an entity associated with the parcel to ship the parcel to the recipient when the location is determined to be within the defined geographic region; and
   directing the entity to hold shipment of the parcel when the location is determined to be outside the defined geographic region, whereby the entity holds shipment of the parcel until a time when the recipient is located within the defined geographic region.

2. The method of claim 1, further comprising detecting a network-based transaction for a product included in the parcel consistent with the shipping file, the network-based transaction indicative of the expected shipment of the parcel.

3. The method of claim 2, wherein the network-based transaction includes a recurring payment account transaction.

4. The method of claim 2, wherein directing the entity to ship the parcel includes appending a distribute indicator to an authorization message associated with the network-based transaction and causing the authorization message to be routed to the entity, whereby the distribute indicator directs the entity to ship the parcel to the recipient; and
   wherein directing the entity to hold shipment of the parcel includes appending a hold indicator to an authorization message associated with the network-based transaction and causing the authorization message to be routed to the entity, whereby the hold indicator directs the entity to hold shipment of the parcel to the recipient.

5. The method of claim 2, wherein the shipping file further includes an account number for a payment account associated with the recipient; and
   wherein detecting the network-based transaction for the product consistent with the shipping file includes detecting the network-based transaction based, at least, on the account number for the payment account.

6. The method of claim 1, further comprising soliciting, by the at least one computing device, a selection of a delivery protection option from the recipient, prior to generating and storing the shipping file.

7. The method of claim 1, further comprising soliciting, by the at least one computing device, the defined geographic region from the recipient, prior to generating and storing the shipping file.

8. The method of claim 7, further comprising soliciting, by the at least one computing device, a permission from the recipient to track the location of the portable communication device, prior to generating and storing the shipping file.

9. The method of claim 1, further comprising, after determining the location is outside the defined geographic region, retrieving, by the at least one computing device, after a defined interval, a further location of the portable communication device from the portable communication device based on the identifier associated with the portable communication device; and
   directing the entity to ship the parcel when the further location is determined to be within the defined geographic region.

10. A distribution system for directing a parcel containing a product to a recipient based on location data for the recipient relative to one or more geographic regions, the distribution system comprising:
    a memory including at least one shipping file for the recipient, the at least one shipping file including an identifier for a portable communication device associated with the recipient and a defined geographic region for the recipient; and
    at least one processor in communication with the memory, the at least one processor configured to;
      detect a network-based transaction for the product consistent with the at least one shipping file and based on an account number for a payment account used to fund the transaction;
      retrieve location data of the portable communication device identified in the at least one shipping file, from the portable communication device, based on the identifier associated with the portable communication device;
      determine, based on the retrieved location data, whether a location of the portable communication device is within the defined geographic region;
      direct an entity associated with the product to ship the product to the recipient when the location is determined to be within the defined geographic region; and
      direct the entity to hold shipment of the product when the location is determined to be outside the defined geographic region, whereby the entity holds shipment of the product until a time when the recipient is located within the defined geographic region.

11. The distribution system of claim 10, wherein the at least one shipping file for the recipient further includes the account number for the payment account.

12. The distribution system of claim 11, further comprising executable instructions, which when executed by the portable communication device, cause the portable communication device to solicit, from the recipient, at least the defined geographic region for the recipient and the account number for the payment account.

13. The distribution system of claim 12, wherein the executable instructions, when executed by the portable communication device, further cause the portable communication device to:
    transmit the identifier to the at least one processor; and
    in response to a request by the at least one processor for the location data of the portable communication device, transmit the location data to the at least one processor.

14. The distribution system of claim 10, wherein the at least one processor is further configured to:
  after determining the location of the portable communication device is outside the defined geographic region, retrieve, after a defined interval, a further location of the portable communication device from the portable communication device based on the identifier associated with the portable communication device; and
  direct the entity to ship the product when the further location is determined to be within the defined geographic region.

15. The distribution system of claim 10, wherein the at least one processor is further configured to:
  solicit a selection of a delivery protection option from the recipient and then solicit the defined geographic region from the recipient; and
  compile the at least one shipping file for the recipient to include the defined geographic region and store the at least one shipping file in the memory.

16. The distribution system of claim 10, further comprising a payment network in communication with the at least one processor;
  wherein the payment network is configured, in connection with directing the entity to ship the parcel, to append a distribute indicator to an authorization message associated with the network-based transaction and route the authorization message to the entity, whereby the distribute indicator directs the entity to ship the parcel to the recipient; and
  wherein the payment network is configured, in connection with directing the entity to hold shipment of the parcel, to append a hold indicator to an authorization message associated with the network-based transaction and route the authorization message to the entity, whereby the hold indicator directs the entity to hold shipment of the parcel to the recipient.

17. A non-transitory computer readable storage media including executable instructions for use in directing a parcel to a recipient, which when executed by at least one processor, cause the at least one processor to:
  generate and store a shipping file for the recipient, the shipping file including an identifier for a portable communication device associated with the recipient and a defined geographic region for the recipient;
  detecting a network-based transaction for a product included in the parcel based on the shipping file and based on an account number for a payment account used to fund the transaction, the network-based transaction indicative of an expected shipment of the parcel;
  in response to detecting the network-based transaction, retrieve location data for a location of the portable communication device, from the portable communication device, based on the identifier associated with the portable communication device;
  determine, based on the retrieved location data, whether the location of the portable communication device is within the defined geographic region;
  direct an entity associated with the parcel to ship the parcel to the recipient when the location is determined to be within the defined geographic region; and
  direct the entity to hold shipment of the parcel when the location is determined to be outside the defined geographic region, whereby the entity holds shipment of the parcel until a time when the recipient is located within the defined geographic region.

18. The non-transitory computer readable storage media of claim 17, wherein the executable instructions, when executed by the at least one processor, further cause the at least one processor to:
  append a distribute indicator to an authorization message associated with the network-based transaction and cause the authorization message to be routed to the entity, thereby directing the entity to ship the parcel to the recipient upon receipt of the authorization message; and
  append a hold indicator to an authorization message associated with the network-based transaction and cause the authorization message to be routed to the entity, thereby directing the entity to hold shipment of the parcel to the recipient upon receipt of the authorization message.

19. The non-transitory computer readable storage media of claim 17, wherein the executable instructions, when executed by the at least one processor, further cause the at least one processor to:
  after determining the location is outside the defined geographic region, retrieve, after a defined interval, a further location of the portable communication device from the portable communication device based on the identifier associated with the portable communication device; and
  direct the entity to ship the parcel when the further location is determined to be within the defined geographic region.

20. The non-transitory computer readable storage media of claim 17, wherein the executable instructions, when executed by the at least one processor, prior to generating and storing the shipping file, to:
  solicit a selection of a delivery protection option from the recipient;
  solicit the defined geographic region from the recipient; and
  solicit a permission from the recipient to track the location of the portable communication device.

* * * * *